Figure 1:
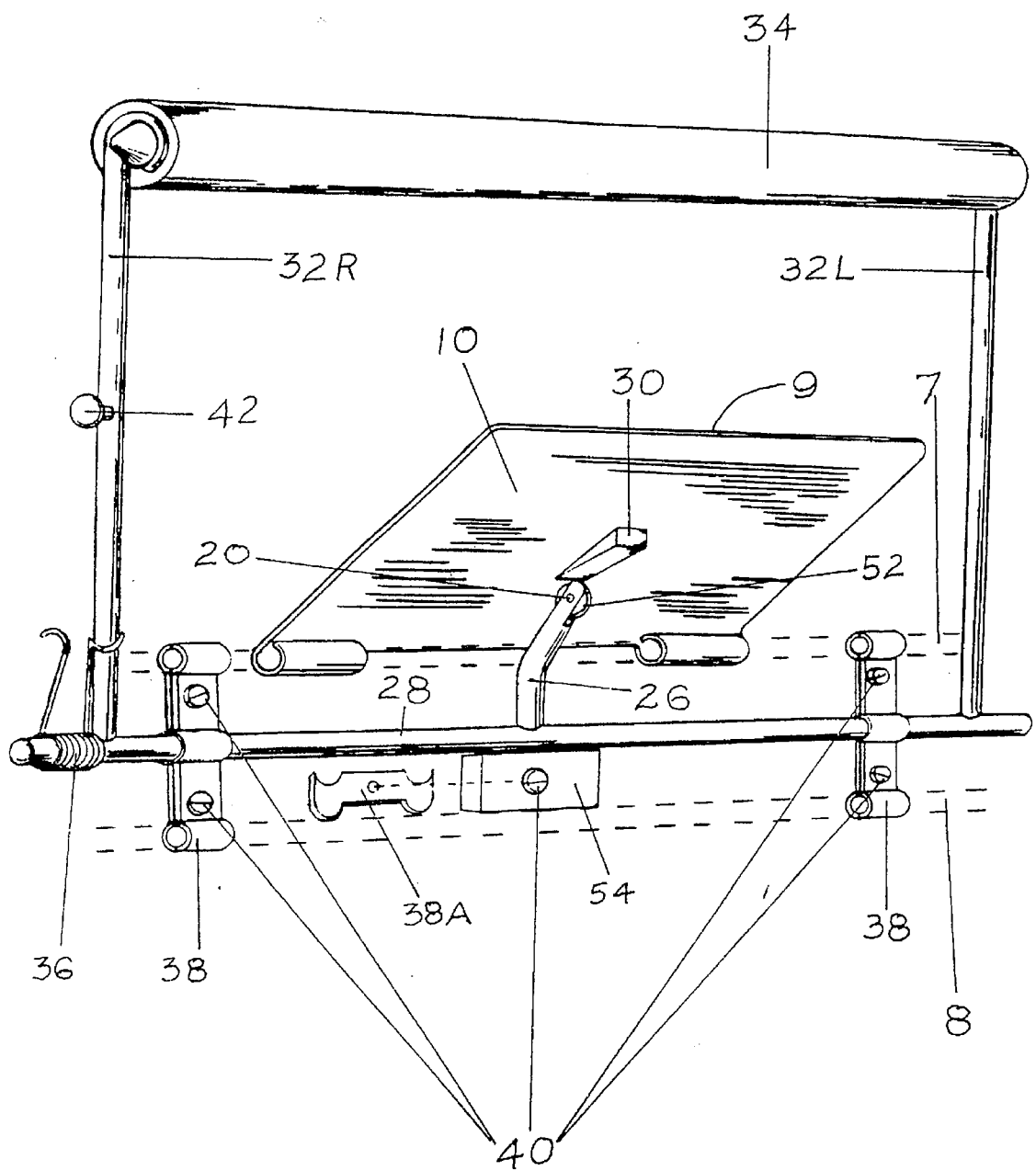

United States Patent [19]

De Stefano

[11] Patent Number: 5,651,557

[45] Date of Patent: Jul. 29, 1997

[54] AUTOMATIC CHILD RESTRAINT FOR SHOPPING CARTS

[76] Inventor: Charles De Stefano, 1301 Lauderdale Dr., Richmond, Va. 23233

[21] Appl. No.: 589,579

[22] Filed: Jan. 22, 1996

Related U.S. Application Data

[63] Continuation-in-part of Ser. No. 149,625, Nov. 9, 1993, abandoned, and Ser. No. 65,217, May 21, 1993, abandoned.

[51] Int. Cl.$^6$ ................... B62B 3/14; B62B 5/08
[52] U.S. Cl. ............... 280/33.993; 280/753; 297/256.17; 297/487
[58] Field of Search ................ 280/33.992, 33.993, 280/748, 753; 297/256.17, 487, 488

[56] References Cited

U.S. PATENT DOCUMENTS

| | | | |
|---|---|---|---|
| 3,184,248 | 5/1965 | Hummer | 280/33.993 |
| 3,306,661 | 2/1967 | Allen | 297/474 |
| 3,453,026 | 7/1969 | Paes et al. | 297/487 |
| 3,888,329 | 6/1975 | Monaghan | 280/753 X |
| 4,108,489 | 8/1978 | Salzman | 280/33.993 X |
| 4,280,731 | 7/1981 | Pitts et al. | 297/487 |
| 4,471,970 | 9/1984 | Trubiano | 280/33.993 |
| 4,537,413 | 8/1985 | Rehrig | 280/33.993 |
| 4,674,758 | 6/1987 | Valley et al. | 297/487 |
| 4,846,527 | 7/1989 | Julien et al. | 297/487 X |
| 4,867,464 | 9/1989 | Cook | 297/484 |
| 4,900,086 | 2/1990 | Steward | 297/488 X |
| 5,100,173 | 3/1992 | Kudler | 280/748 |
| 5,203,613 | 4/1993 | Ward | 297/484 |
| 5,348,323 | 9/1994 | Trubiano | 280/33.993 |

*Primary Examiner*—Brian L. Johnson
*Assistant Examiner*—Avraham Lerner

[57] ABSTRACT

A safety device that engages automatically when a child is placed in a shopping cart. It does not require the aid of a parent. A torsion spring retains a shopping cart seat at an inclined angle, while retaining the safety device to the rear of the shopping cart, free for the child to enter. As the child is placed in the cart, his/her weight descends the seat to normal. A lever is under the seat rotating downward as the seat descends. The lever is welded at the center of a shaft, and is rotating the shaft as the lever moves. A right arm and a left arm welded to the shaft are traversing forward to a securing position. Connected near the top end of the two arms is a safety bar securing the child when seated. A latch locks the arms in the securing position. The entire safety device is mounted to the shopping cart with a clamp. There are four clamps used. When two clamps are connected together they form one clamp with three horizontal holes. The top and bottom holes connect to a horizontal top bar, and a horizontal bottom bar that is part of the cart. The middle holes, having a larger diameter, is a sleeve for the shaft to rotate in, while mounting the safety device to the shopping cart.

13 Claims, 8 Drawing Sheets

AUTOMATIC CHILD RESTRAINT FOR SHOPPING CARTS

This is a continuation in part of Ser. No. 08/149,625, Filed Nov. 9, 1993 now abandoned, and Ser. No. 08/065, 217, Filed, May 21, 1993 now abandoned.

BACKGROUND FIELD OF INVENTION

This invention relates to an automatic child safety device, specifically for shopping carts.

BACKGROUND-DESCRIPTION OF PRIOR ART

Most shopping carts have a seat for children. Injuries from children falling out of shopping carts happen everyday. Most of the injuries are head injuries when the child falls on a concrete floor. Stores realize the seriousness of the problem, and have been installing seat belts and restraining straps on their own carts. Prior art U.S. Pat. No. 3,306,661 (1967) to D. L. Allen, on a safety retaining belt, and U.S. Pat. No. 4,674,758, (1987), to Charles and Patricia Valley, on a child support device, accomplishes the same thing. The problem with the prior art, and with the above methods is that parents do not take the time to install the safety device on their children. A safety device is only good if the parents use them. Parents must believe the child is safe in the shopping cart as long as they are present. However, once the parents are shopping, and not watching their child, it only takes the child 3 to 5 seconds to climb out of the cart and fall.

The main object of my invention is to prevent serious injuries to children by taking the responsibility of using the safety device away from the parent. This is accomplished with a safety device that engages automatically when the child is placed in the cart.

OBJECTS AND ADVANTAGES

Accordingly, several objects and advantages of the present invention are:

(a) It prevents a child from climbing out, and falling from a shopping cart.

(b) It is an automatic device that does not rely on the parent to use it. It is unfeasible to use the seat without engaging the safety device.

(c) It is permanently attached to the cart.

(d) It does not interfere with the operation of the shopping cart. The seat section can be folded, and the carts can be stacked, or pushed together for compact storage.

(e) It is inexpensive to manufacture. It could be installed on new carts as they were manufactured, or adapter kits could be made for existing carts. The big disadvantage of the prior art is the parents do not use them. Because of this serious injuries are occurring.

DESCRIPTION OF DRAWINGS; FIGS. 1, 2, 3, 4, 5, 6, 7, 8, 9, 10.

FIG. 1—shows a perspective view of a basic version of a first embodiment.

Figure 2:
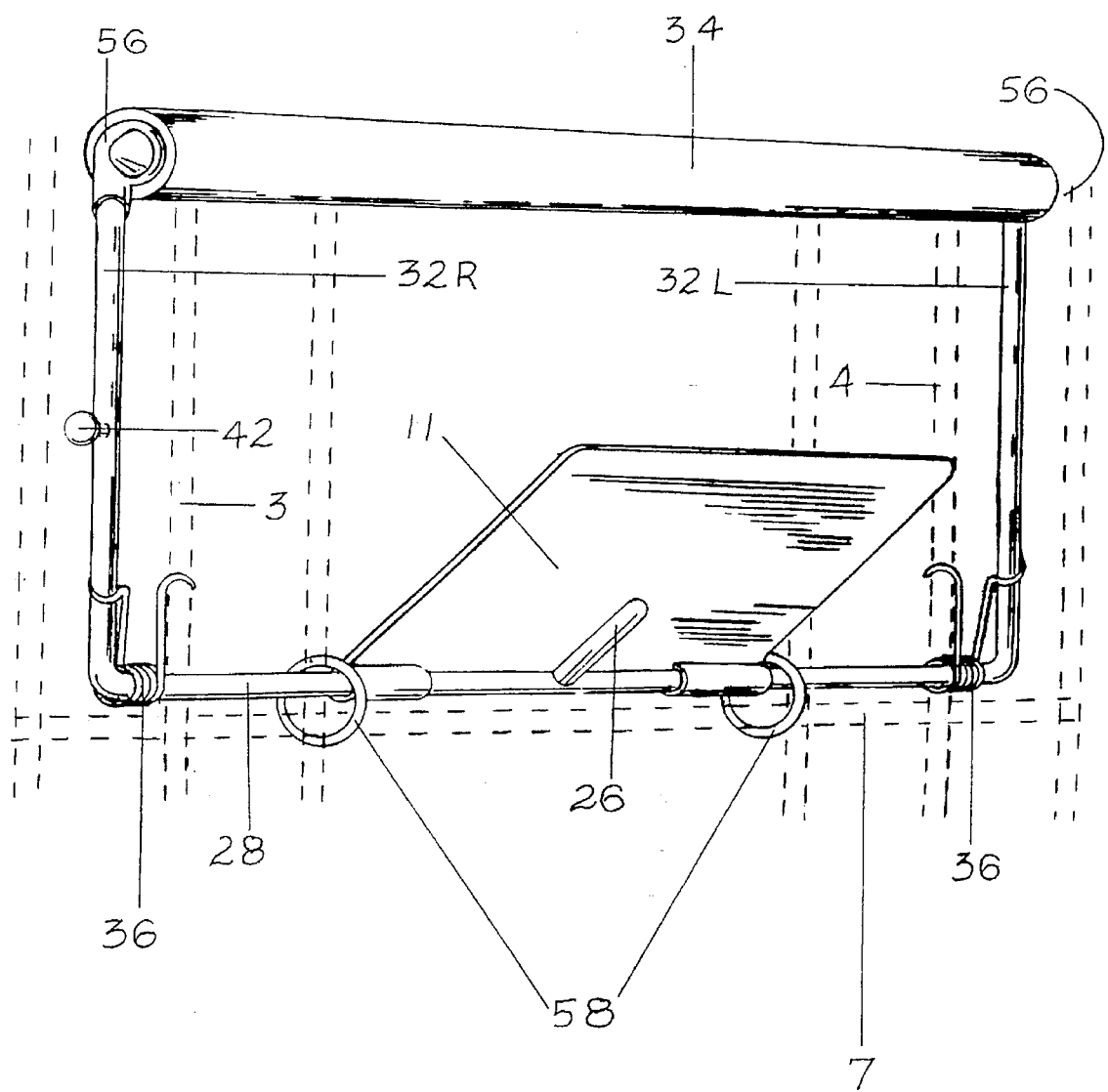

FIG. 2—shows a perspective view of a second embodiment, a variation of the first embodiment.

Figure 3:
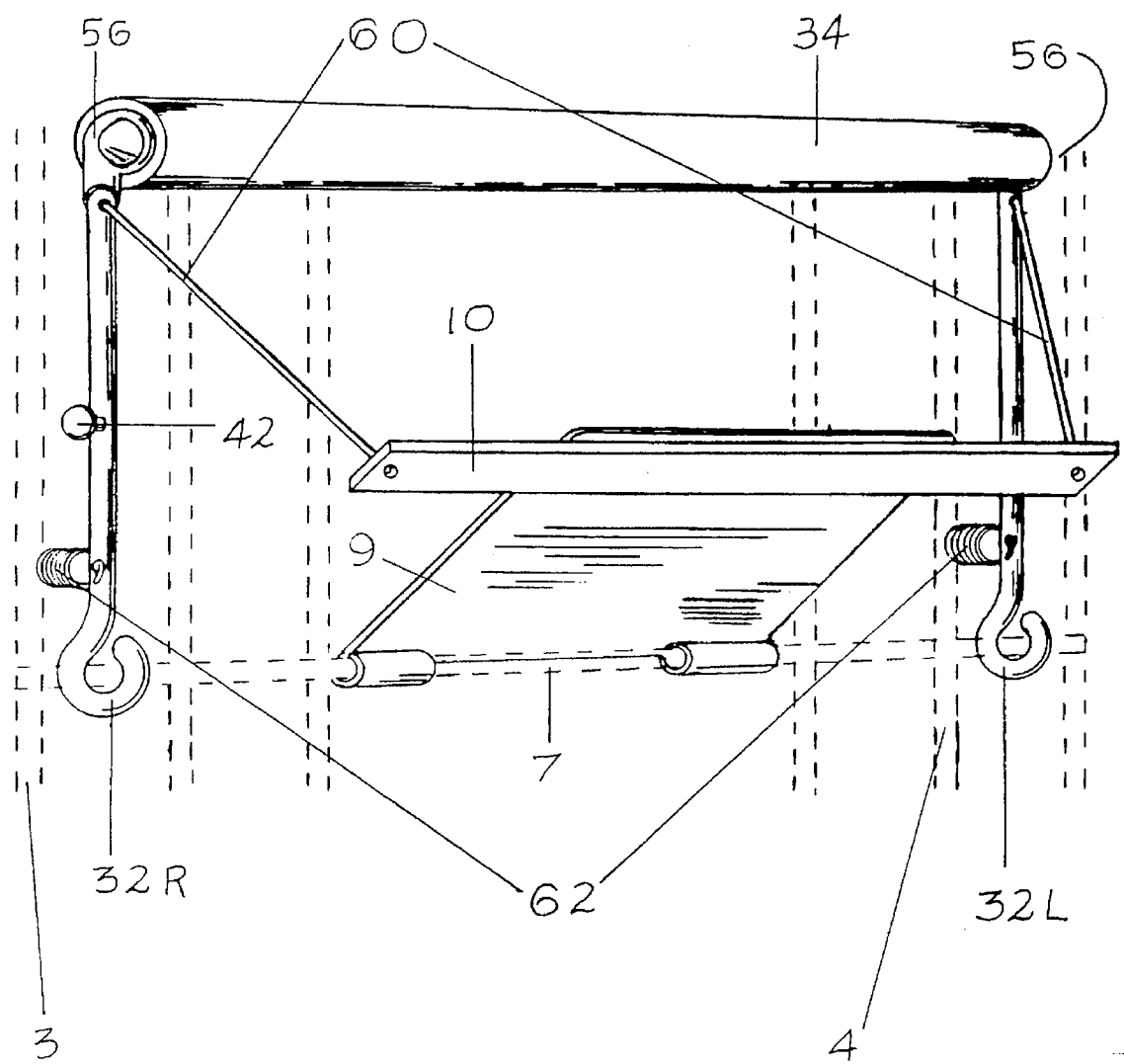

FIG. 3—shows a perspective view of a third embodiment, another variation of the first embodiment.

Figure 4:
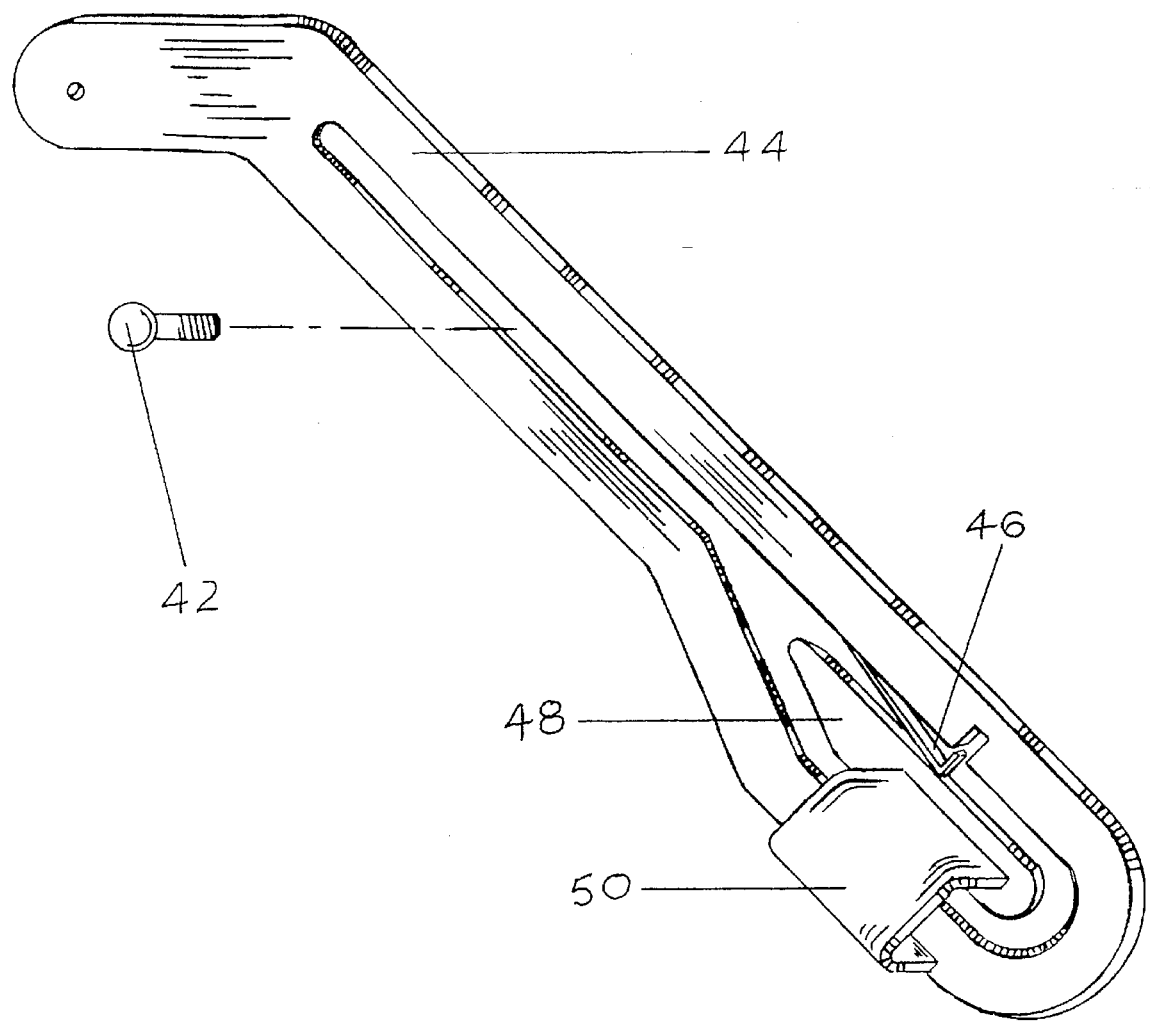

FIG. 4—shows a perspective view of a latch assembly that locks the arms and safety bar of the first, second and third embodiments in the forward, or securing position.

Figure 5:
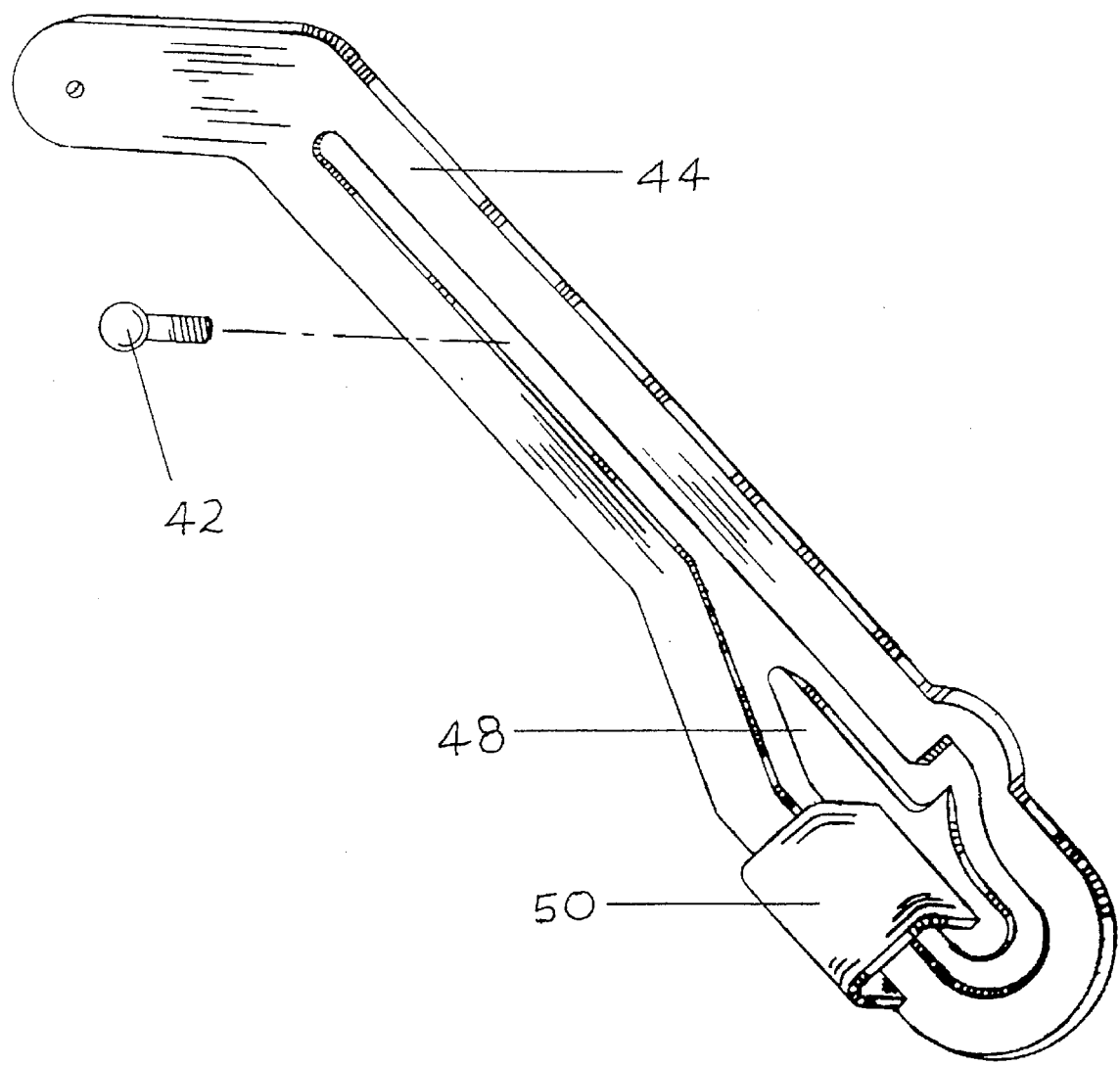

FIG. 5—is a perspective view of a latch assembly, with a modification to the latch shown in FIG. 4.

Figure 6:
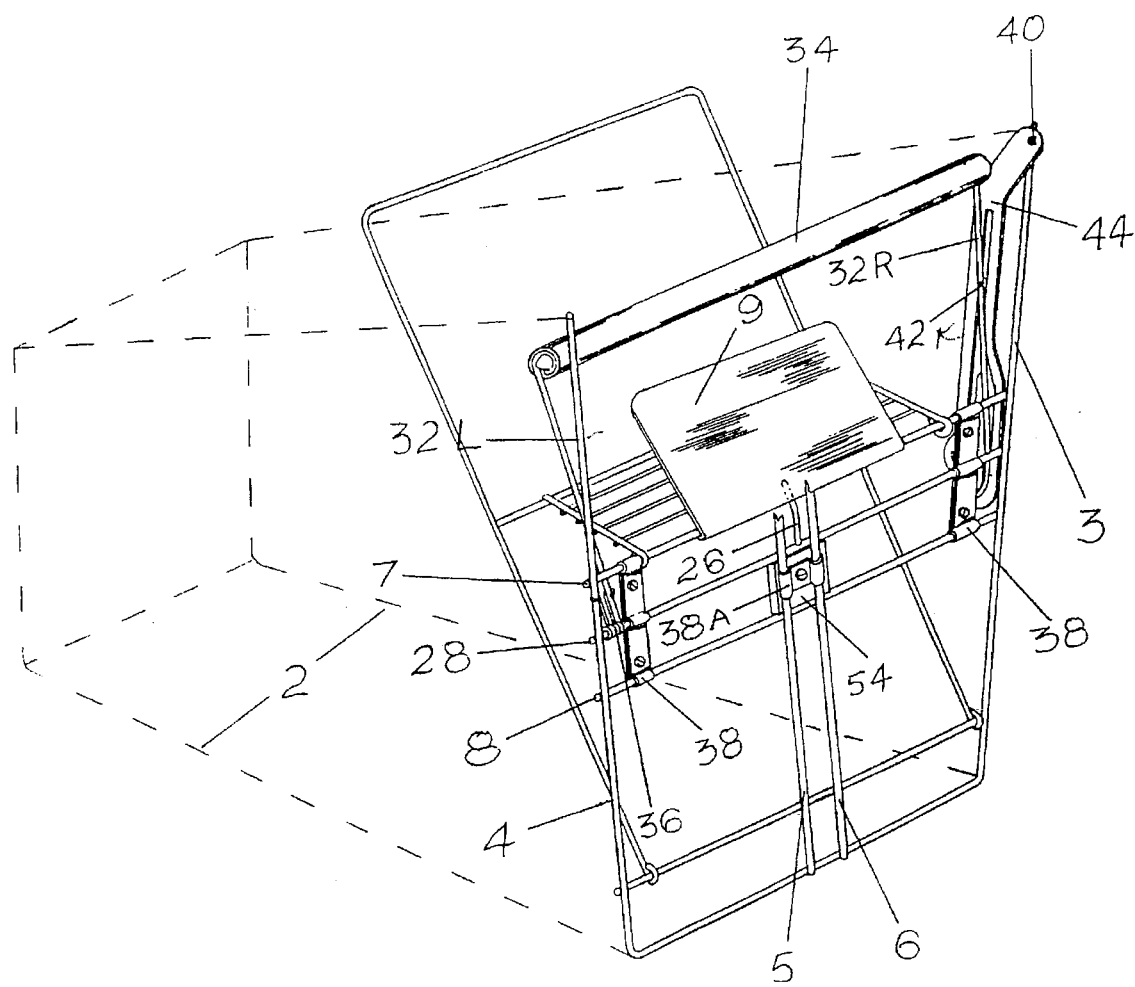

FIG. 6—is a perspective view of the first embodiment, and latch assembly of FIG. 5, installed on a shopping cart.

Figure 7:
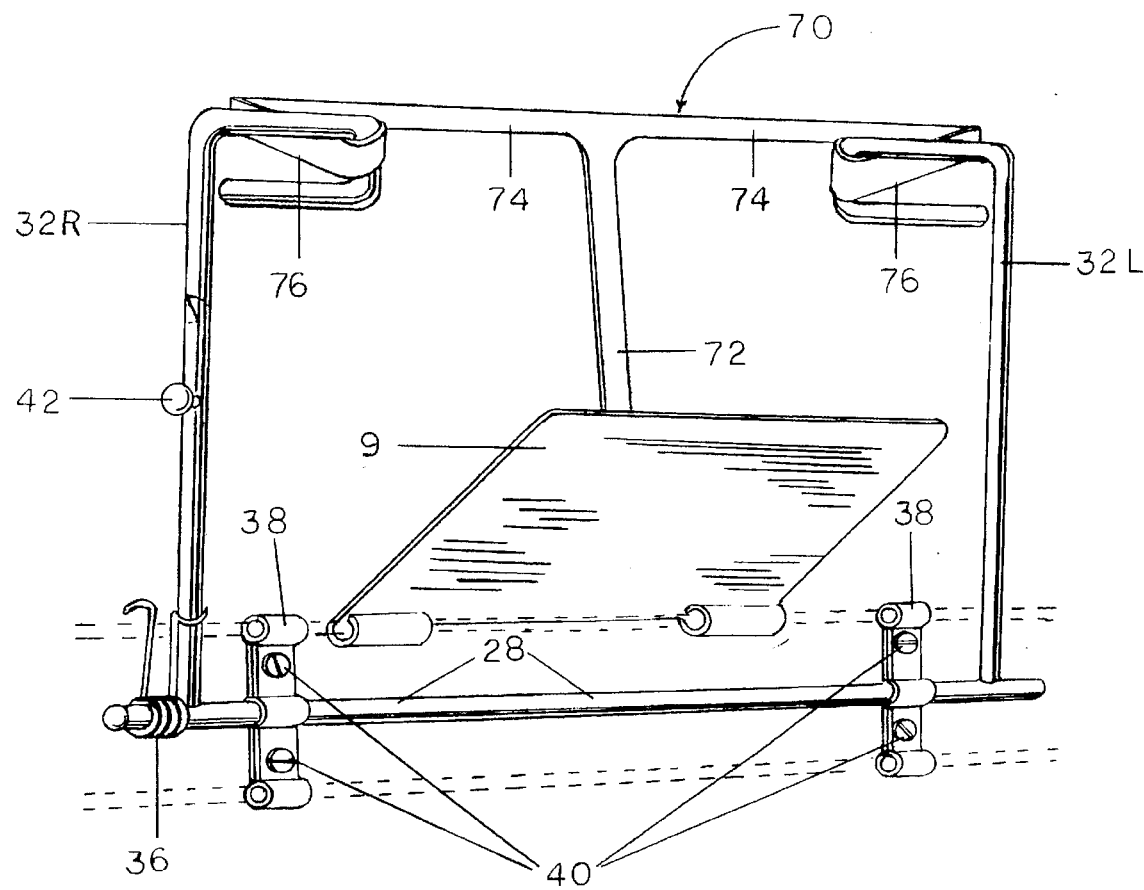

FIG. 7—is a perspective view of the first embodiment with a T safety bar, the arms bent in a U shape, and the lever omitted.

Figure 8:
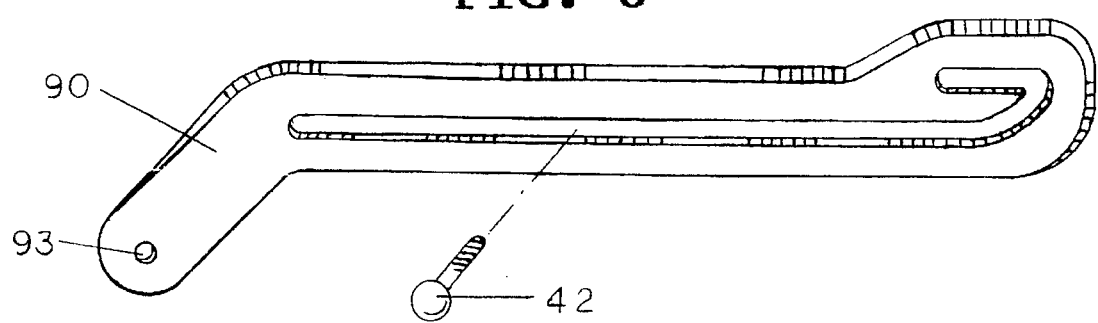

FIG. 8—is a perspective view of a manual locking latch.

Figure 9:
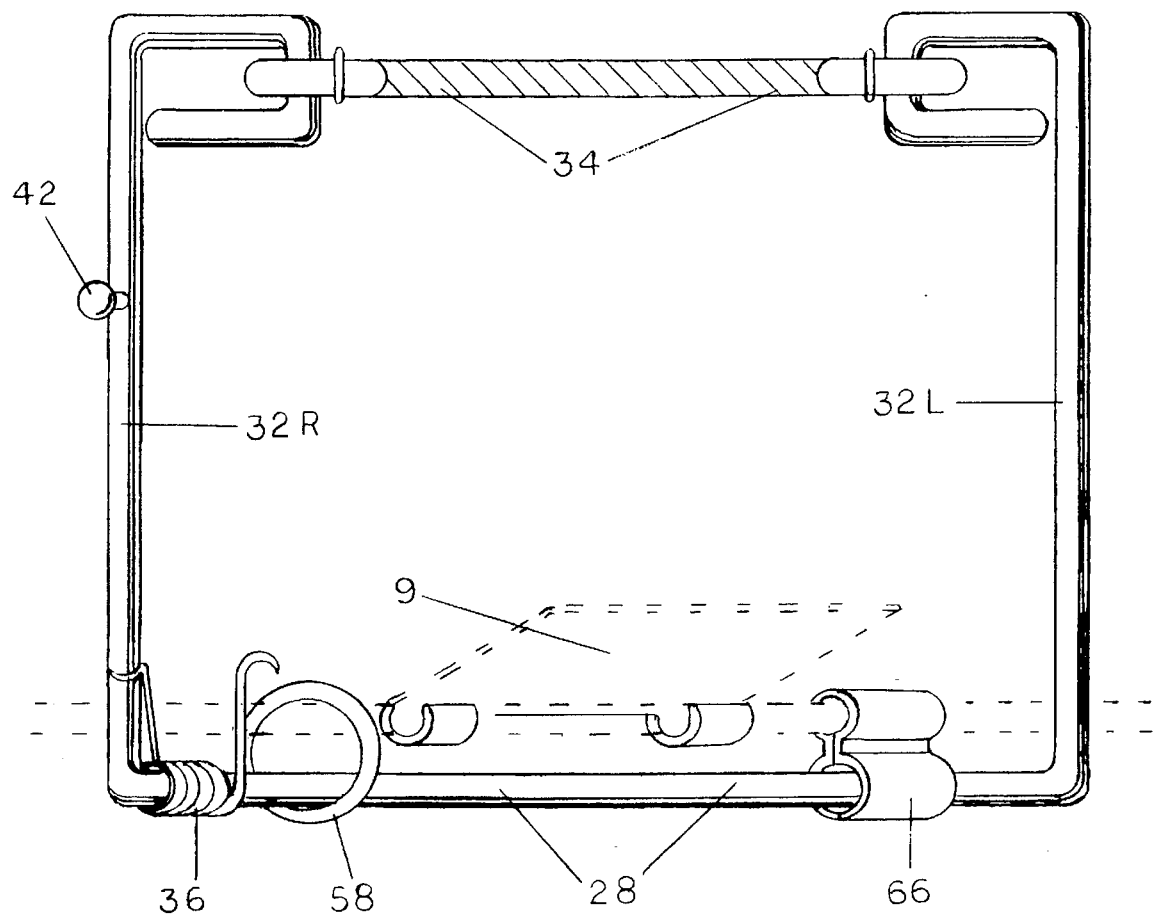

FIG. 9—is a perspective view of a manual operated safety device, a variation of the first and second embodiments.

Figure 10:
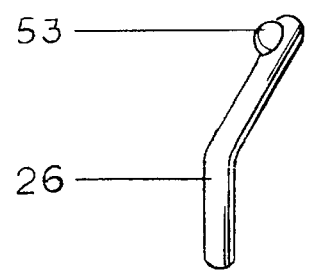

FIG. 10—is a perspective view of a lever with a ball bearing substituting for a wheel.

DESCRIPTION OF THE FIRST EMBODIMENT, (shown in FIG. 1, 6, and 7).

A steel plate 10, to add stability, is glued or riveted to the bottom of a plastic seat 9. The plastic seat is part of a shopping cart 2, and not part of the invention. An alternative method is to replace the plastic seat 9 with a ridged seat 11, made of a ridged material. A wedge 30 is welded to the bottom of steel plate 10, or molded into ridged seat 11. The wedge tapers from 0 to 5/16" of an inch. A cam, or lever 26 is welded to a shaft 28 at the center of shaft 28. The lever 26 is vertical at shaft 28, and is bent midway up towards the front of the cart. When the seat is against the top of lever 26, the seat is at an inclined angle, not exceeding a 45 degree angle. Seat nor steel plate 10 is attached to lever 26. At the second end of lever 26 is a 3.32" of an inch groove. In the groove is a ridged wheel 52, and is rotating on a roll pin, or axle 20. An alternative to using the wheel 52 is a ball bearing 53, shown in FIG. 10. The end of a right arm 32R, and one end of a left arm 32L are welded to shaft 28 three quarters of an inch in at each end of shaft 28. Lever 26, shaft 28, and right and left arms, 32R and 32L, are made from 5/16" inch steel rod. The second end of the two arms 32R and 32L are shaped to have a safety bar 34, or a restraining element 34 connected. The shape of the arm ends depend on what safety bar is used. The preferred method is to bend the arms at their top in a U shape as shown in FIG. 7. Shown in FIG. 7 also is the preferred safety bar, the T bar 70, or T element 70. The T bar is made of any material that will restrain children. The T bar is made as one piece, or as several pieces attached together. A vertical upright 72 is a stiff material to support a horizontal part 74 from sagging and blocking the leg hole openings. The preferred T bar is a one piece material, a thin flexible plastic, parts 72 and 74. The bottom of the vertical upright 72 is pivotally attached to the seat 11 with forward and backward movement. An elastic material 76 is attached at each end of horizontal part 74, and the second end of the elastic material 76 is attached to the inside portion of the U shaped arms 32R and 32L. On the right side of shaft 28 is a torsion spring 36 connecting the right arm 32R, to a vertical bar, or member 3 that is part of the shopping cart 2. The torsion spring 36 slides on shaft 28 and has enough tension to retain the seat at an inclined angle, while retaining the arms with the safety bar attached, fully back in a rear position. An alternative is to use two torsion springs 36 of lesser tension on each end of shaft 28. The shaft 28 is connected to the cart 2, with a clamp 38. There are four clamps, two on the right side front to back, and two on the left side front to back, forming two clamps with three (3) horizontal holes. The clamps 38 are connected together with a nut and bolt, or rivet 40. The shaft 28 is in the middle holes of each clamp 38. The middle holes are slightly larger in diameter to allow the shaft to rotate freely. The top and bottom holes in clamps 38 connect to a horizontal top bar 7, and a horizontal bottom bar 8 that is part of the cart. A center support 54 is in between shaft 28, and horizontal bar 8.

Center support 54 is a ¼" inch thick, and is connected to a center vertical bar 5, and a center vertical bar 6, with a clamp 38A. Clamp 38A is connected to center support 54, with a rivet 40. An alternative method is to insert a roll pin into a hole, directly under the shaft, in either center vertical bar 5, or 6. A portion of the roll pin is extended outward under the shaft for support.

A latch assembly, (shown in FIG. 4), and a pin 42, shown in FIGS. 1, 2, 3, 4, 5, and 6, includes the pin 42 with ⅛" of an inch shaft threaded halfway. The threaded portion is threaded into right arm 32R. The remainder of pin 42 extends into a groove in a latch 44. At the top end of latch 44 is a hole where a rivet 40, connects it pivotally mounted to vertical bar, or vertical member 3. The groove in the latch is 3/16" of an inch. Welded to the latch 44 is a spring steel 46, which moves upward and downward. A island 48 is welded at the middle to one side of a C bracket 50. The second side of C bracket is welded to the bottom of latch 44. This forms a 3/16" groove all around island 48, and the upper groove has the spring steel 46. Latch 44, island 48, and C bracket 50 are made of 1/16" of an inch steel.

A latch assembly (shown in FIGS. 5 & 6), a variation of the latch shown in FIG. 4, operates in the same manner as the latch in FIG. 4, except the spring steel 46 is not used. A upward slot, in a top groove allows the latch to drop down on pin 42, forestalling the arms from moving backward.

DESCRIPTION OF A SECOND EMBODIMENT, shown in FIG. 2, is a variation of the first embodiment. The difference between the first and second embodiments is a shaft 28 is bent at both ends to form a right arm 32R, and a left arm 32L. A torsion spring 36 is slid onto the shaft 28 before it is bent. The mounting means shown in FIG. 2 is a ring 58. Two rings are used and go around the shaft 28 and horizontal top bar 7, allowing the shaft to rotate freely. The rings are split and squeezed together, or are welded closed.

DESCRIPTION OF A THIRD EMBODIMENT, shown in FIG. 3, is another variation of the first embodiment. A right arm 32R, and a left arm 32L are bent around an existing horizontal bar 7, on a cart 2, so the arms are pivotally mounted. Each arm 32R & 32L correspondingly connects to a right vertical 3, and a left vertical 4, with an extension spring 62. One end of the extension spring 62, is fitted in a small hole in each arm 32R & 32L, and the second end is fitted in a hole on corresponding vertical bars 3 & 4. An alternative method is to use a stretch rubber, or a torsion spring in place of the extension springs. A extended ridged seat 11, replaces a cart seat 9, and is as wide as the distance between the two arms 32R & 32L. An alternative method is to use the cart seat 9, (shown in FIG. 3), with a steel plate 10. The steel plate 10 extends passed each end of the seat to a distance equal to the two arms. A connector 60, joins each arm 32R, and 32L, to the back of extended ridged seat 11, or extended steel plate 10. When the connectors 60 are fully extended, and the arms 32R & 32L are fully back in a rear position, seat 11 is at an inclined angle. The connectors 60 are made of a flexible material. The preferred method of installation is to put a hole near the top of each arm 32R & 32L, and two holes in the back of ridged seat 11, or steel plate 10. The connectors 60, steel cable material, is pushed in the holes and welded at their ends to prevent connectors 60 from pulling out. The connectors 60 are made of any flexible material including, but not limited to; rope, leather, plastic, rubber, wire. The top portion of the two arms are shaped to have a safety bar 34 connected. The shape of the arm ends depend on what safety bar is used. The safety bar 34 is connected to right arm 32R, and left arm 32L. The safety bar is comprised of any material that will restrain children, including but not limited to; leather, seat belt, elastic, wood, metal, plastic, spring, and rubber.

Shown in FIG. 7 is a manual closing device. This device is the same as the first embodiment shown in FIG. 1, with the difference being the lever 26 is omitted. With the lever 26 omitted, the seat 9 is not involved in the closing of the device. Shown in FIG. 7 also, is the improved T bar 70, and arms 32R and 32L bent in a U shape as explained in the description of the first embodiment.

Shown in FIG. 8 is a manual latch 90. Latch 90 is a flat piece of steel with a groove in the center. The groove is slightly larger then a pin 42, allowing the pin 42 to move freely. The pin 42 is threaded into arm 32R with a portion remaining out that moves in the groove. There is a hole 93 allowing latch 90 to be pivotally mounted to vertical member 3 that is part of the shopping cart 2.

Shown in FIG. 9 is a manual closing device, a variation of the second embodiment shown in FIG. 2, and the manual closing device shown in FIG. 7. A shaft 28, arms 32R and 32L, and the top portion of the arms are all one piece. A safety bar 34 is made of a stretch elastic. One torsion spring 36 is all that is needed. There are various mounting means including the flat clamp 66 that is shown. The flat clamp 66 is one piece that bends in half forming two cylinders. The top cylinder fits snugly around an existing horizontal bar 7 on the cart, and loosely around shaft 28. When bent in half the flat clamp 66 snaps together.

OPERATION FIGS. 1, 2, 3, 4, 5, 6, 7, 8, and 9.

THE FIRST AND SECOND EMBODIMENTS operates in the following manner. Refer to FIGS. 1, 4, 5, and 6. A torsion spring 36 retains a left arm 32L, a right arm 32R, and a safety bar 34 back in a rear position of a shopping cart 2, free for a child to enter. A lever 26 underneath a seat 9, uplifted the seat to an inclined angle. As a parent places the child in the cart 2, his/her weight descends the seat to normal. As the seat descends, the downward movement is rotating lever 26. As lever 26 rotates, a wheel 52, or ball bearing 53, attached at the end of lever 26 is rolling outward on a wedge 30. The lever 26 welded to a shaft 28 is rotating the shaft. As the shaft 28 rotates, right and left arms 32R and 32L connected to the shaft, are traversing forward towards the child in a securing position. When in the securing position, the T safety bar 70 is encircling the child with the vertical upright 72 in-between the child's legs. The T safety bar 70 is a universal fit for the average child. The stretch elastic 76 at both ends has enough stretch for an over size child. When the arms are traversing forward, a pin 42 threaded in arms 32R, is moving a latch 44 with it. The pin is moving in a top groove in latch 44. When the child is seated, and the arms are in the securing position at the backrest, the pin is just past a spring steel lock 46. The spring steel 46 prevents the pin 42 and arms 32R and 32L from reversing in the top groove, or locking the arms and safety bar forward in the securing position. As the parent removes the child from the cart the entire process reverses. The parent uses two hands. The parent's left hand pushes the right arm 32R further forward so the pin 42 is at the end of latch 44. The parent's right hand lifts the latch up while releasing right arm 32R. The pin 42 is now in a lower groove free to move. The latch is unlocked. With the latch unlocked, the parent lifts the child up off of the seat. As the weight is removed from the seat, the torsion spring 36 returns the safety bar 34 back to the rear position, and the seat uplifts to an inclined angle for the next child.

THE THIRD EMBODIMENT operates in the following manner. Refer to FIGS. 3, 4, and 5. The extension springs 62, retain a right arm 32R, and a left arm 32L, with a safety bar 34 attached, back in a rear position. Attached to each arm 32R and 32L is a connector 60, that joins the arms to a seat 11. When arms 32R & 32L are back in the rear position, the connectors 60 are uplifting the seat to an inclined angle. As a parent places a child in a cart 2, the weight of the child descends the seat to normal. As the seat descends, it is traversing arms 32R & 32L towards the child in a securing position. With the arms 32R & 32L forward in the securing position, the safety bar 34 connected to the arms is encircling the child. As the parent removes the child from the cart, the entire process reverses.

THE MANUAL OPERATED devices shown in FIGS. 7 and 9 operates in the following manner. When the child is seated, the parent pushes the arms forward towards the child, until either the T bar 70, or stretch elastic bar 34, is encircling the child. A latch is needed to secure the arms and safety bar in this forward position, or the torsion spring 36 will return the arms and safety bar back to the open position. There are several types of latches that can be used, including the one shown in FIG. 8. A manual latch 90 shown in FIG. 8 operates in the following manner. A pin 42 that is threaded into arm 32R is in the groove in latch 90. As the parent pushes the arms forward, the latch pivots at point 93 from vertical to horizontal as the pin 42 moves forward in the groove. When the arms and safety bar are in the securing position, the pin is at the furthest point forward where the top and bottom grooves connect. The parent releases the arm, and the pin and arm move backward in the top groove to the stop. To release the latch, the parent pushes forward on the arm, lifts up on the latch while releasing the arm in the lower groove.

SUMMARY, RAMIFICATIONS, AND SCOPE

Thus the reader will see that the automatic child restraint will prevent countless thousands of serious injuries to children from shopping cart related accidents. Parents do not realize the dangers, nor how fast an accident can happen. The automatic restraint does the job of securing their child for them. Furthermore, the automatic restraint has the additional advantages in that:

It is inexpensive to manufacture, and therefore stores have no reason not to use it.

It is permanently attached to the cart.

It does not interfere with the carts operations. Carts are stacked and pushed together as before, and the seat compartment folds up.

Although the description above contains many specificities, these should not be construed as limiting the scope of the invention but as merely providing illustrations of some of the presently preferred embodiments of this invention. Many other variations are possible. For example:

A shaft 28 is molded into, or permanently attached to a plastic seat 9. This allows the shaft to rotate when the seat is raised or lowered.

Another variation is a lever 26 extending horizontally from a shaft 28 and curving upward towards the seat.

There are also several ways to latch or lock the arms forward in the securing position, both manually and automatically.

Accordingly, the scope of the invention should be determined not by the embodiments illustrated, but by the appended claims and their legal equivalents.

I claim:

1. A child restraint device attached to a shopping cart comprising a bar member comprising an elongated horizontal bar, means for mounting said bar member to said shopping cart so that said bar member is rotatably mounted, a plurality of arms extending upwardly at opposite ends of said horizontal bar, each arm terminating in an inwardly extending U-shaped end for retaining a restraining element there between, one of said arms having latching means for securing the restraint device in a forward position.

2. The child restraint device of claim 1 wherein said means for mounting said bar member to said shopping cart is four clamps that connect together to top, and bottom horizontal existing bars on said shopping cart, while a sleeve in the middle of said clamps allows said bar member to rotate freely.

3. The child restraint device of claim 1 wherein said means for mounting said bar member to said shopping cart is a part that encircles said top existing horizontal bar on said shopping cart, and said bar member, so that said bar member rotates freely.

4. The child restraint device of claim 1 further including a latch assembly comprising a pin with means to connect said pin to one of said bar member's upright arms, a latch with mounting means to connect said latch pivotally to a vertical member on said shopping cart, said latch having a groove where said pin moves freely from a released vertical position to a securing horizontal position, latching means when said restraining device is in a securing position, and means for releasing said restraining device from the securing position.

5. A child restraint device for a shopping cart comprising, a bar member made with an elongated horizontal bar, a plurality of arms extending upward at opposite ends of said horizontal bar, means for mounting said bar member to said shopping cart so that said bar member is rotatably mounted, a restraining element and means to connect said restraining element to said bar member's upright arms, a seating element and means mounted to said seating element so that said seating element has up and down movement, and a lever connected at one end to said bar member, while a second end of said lever has means for supporting said seating element at an inclined angle.

6. The child restraint device of claim 5 wherein said seating element further includes a wedge on the bottom of said seating element.

7. The child restraint device of claim 5 wherein said lever further includes a wheel that is rotatably mounted inside a groove at the second end of said lever.

8. The child restraint device of claim 5 wherein said lever further includes a ball bearing that fits inside a round pocket in the second end of said lever, allowing said ball bearing to roll freely.

9. The child restraint device of claim 5 wherein said restraining element further includes a vertical upright, at one end said vertical upright is supporting a horizontal part of said restraining element, while a second end of said vertical upright is pivotally attached to said seating element.

10. The child restraint device of claim 5, wherein said means for mounting said bar member to said shopping cart is four clamps that connect together to top, and bottom horizontal existing bars on said shopping cart, while a sleeve in the middle of said clamps allows said bar member to rotate freely.

11. The child restraint device of claim 5 wherein said means for mounting said bar member to said shopping cart is a part that encircles said top existing horizontal bar on said shopping cart, and said bar member, so that said bar member rotates freely.

12. The child restraint device of claim 5 wherein said means to form a plurality of arms is said elongated horizontal bar bent at a predetermined distance at each end, to a right angle.

13. The child restraint device of claim 5 further including a latch assembly comprising a pin with means to connect said pin to one of said bar member's upright arms, a latch with mounting means to connect said latch pivotally to a vertical member on said shopping cart, said latch having a groove where said pin moves freely from a released vertical position to a securing horizontal position, latching means when said restraining device is in a securing position, and means for releasing said restraining device from the securing position.

\* \* \* \* \*